United States Patent
Shintani

(10) Patent No.: US 9,516,182 B2
(45) Date of Patent: Dec. 6, 2016

(54) IMAGE FORMING APPARATUS THAT ENHANCES OPERABILITY ON SCREEN DISPLAYED AS SPLIT SCREENS

(71) Applicant: Kyocera Document Solutions Inc., Osaka (JP)

(72) Inventor: Yoshihisa Shintani, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/555,688

(22) Filed: Nov. 28, 2014

(65) Prior Publication Data

US 2015/0146255 A1 May 28, 2015

(30) Foreign Application Priority Data

Nov. 28, 2013 (JP) ................................. 2013-246205

(51) Int. Cl.
G06F 3/12 (2006.01)
H04N 1/00 (2006.01)
G06F 3/0481 (2013.01)

(52) U.S. Cl.
CPC ........ *H04N 1/00474* (2013.01); *G06F 3/0481* (2013.01); *H04N 1/0092* (2013.01); *H04N 1/00392* (2013.01); *H04N 1/00413* (2013.01); *H04N 1/00477* (2013.01); *G06F 2203/04803* (2013.01); *H04N 2201/0094* (2013.01)

(58) Field of Classification Search
None
See application file for complete search history.

(56) References Cited

U.S. PATENT DOCUMENTS

| 6,741,818 | B1* | 5/2004 | Penke | G03G 15/5016 399/107 |
|---|---|---|---|---|
| 2005/0084277 | A1 | 4/2005 | Kushida et al. | |
| 2006/0028661 | A1* | 2/2006 | Uruma | H04N 1/00408 358/1.6 |
| 2006/0285869 | A1 | 12/2006 | Kushida et al. | |
| 2012/0075652 | A1* | 3/2012 | Miyamoto | H04N 1/00384 358/1.13 |
| 2013/0176246 | A1* | 7/2013 | Kohigashi | G06F 3/041 345/173 |
| 2013/0305184 | A1* | 11/2013 | Kim | G06F 3/0481 715/781 |

FOREIGN PATENT DOCUMENTS

| JP | 2002-228466 A | 8/2002 |
|---|---|---|
| JP | 2005-119136 A | 5/2005 |
| JP | 2005-131984 A | 5/2005 |
| JP | 2009-140488 A | 6/2009 |
| JP | 2009-164977 A | 7/2009 |
| JP | 2013-182495 A | 9/2013 |

* cited by examiner

*Primary Examiner* — Huo Long Chen
(74) *Attorney, Agent, or Firm* — James Judge

(57) ABSTRACT

An image forming apparatus includes a display unit and a split screen processor. The display unit includes a display area on a first screen, splits the display area on the first screen to display a third screen on one split display area, and displays a second screen on another split display area. The split screen processor controls the display unit so as to split the display area on the first screen corresponding to display content on the first screen and display content on the second screen in response to an operation for split screen when accepting a user operation on the first screen, displays the third screen resized from the first screen on the one split display area to continuously accept an operation from the user, and displays the second screen to accept an operation simultaneously with the third screen on the other split display area.

8 Claims, 6 Drawing Sheets

FIG. 3

Priority Setting Table 32

| Display Content | Priority Level |
|---|---|
| System Settings | 8 |
| Address Book Registration | 8 |
| Copy Function | 2 |
| Facsimile Function | 2 |
| On-Screen Keyboard | 8 |
| ... | ... |

# IMAGE FORMING APPARATUS THAT ENHANCES OPERABILITY ON SCREEN DISPLAYED AS SPLIT SCREENS

INCORPORATION BY REFERENCE

This application is based upon, and claims the benefit of priority from, corresponding Japanese Patent Application No. 2013-246205 filed in the Japan Patent Office on Nov. 28, 2013, the entire contents of which are incorporated herein by reference.

BACKGROUND

Unless otherwise indicated herein, the description in this section is not prior art to the claims in this application and is not admitted to be prior art by inclusion in this section.

An image forming apparatus includes an operation unit that accepts settings of operation instructions for the image forming apparatus. Some operation units include a touch panel type display unit. The display unit can perform various settings such as an indication of a state of the image forming apparatus, displays of a state of image formation and the number of print copies; and as a touch panel, functions such as duplex printing and black-and-white inversion, magnification setting, and print density setting.

Some image forming apparatuses can run a plurality of jobs in parallel. Techniques such as to display a split screen, display a job status on each split screen, and accept instructions from a user have been proposed.

SUMMARY

An image forming apparatus according to an aspect of the disclosure includes a display unit and a split screen processor. The display unit includes a display area on a first screen, splits the display area on the first screen to display a third screen on one split display area, and displays a second screen on another split display area. The split screen processor controls the display unit so as to split the display area on the first screen corresponding to display content on the first screen and display content on the second screen in response to an operation for split screen when accepting a user operation on the first screen, displays the third screen resized from the first screen on the one split display area to continuously accept an operation from the user, and displays the second screen to accept an operation simultaneously with the third screen on the other split display area.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 illustrates a setting example for a priority setting table according to the one embodiment.

DETAILED DESCRIPTION

Figure 1:
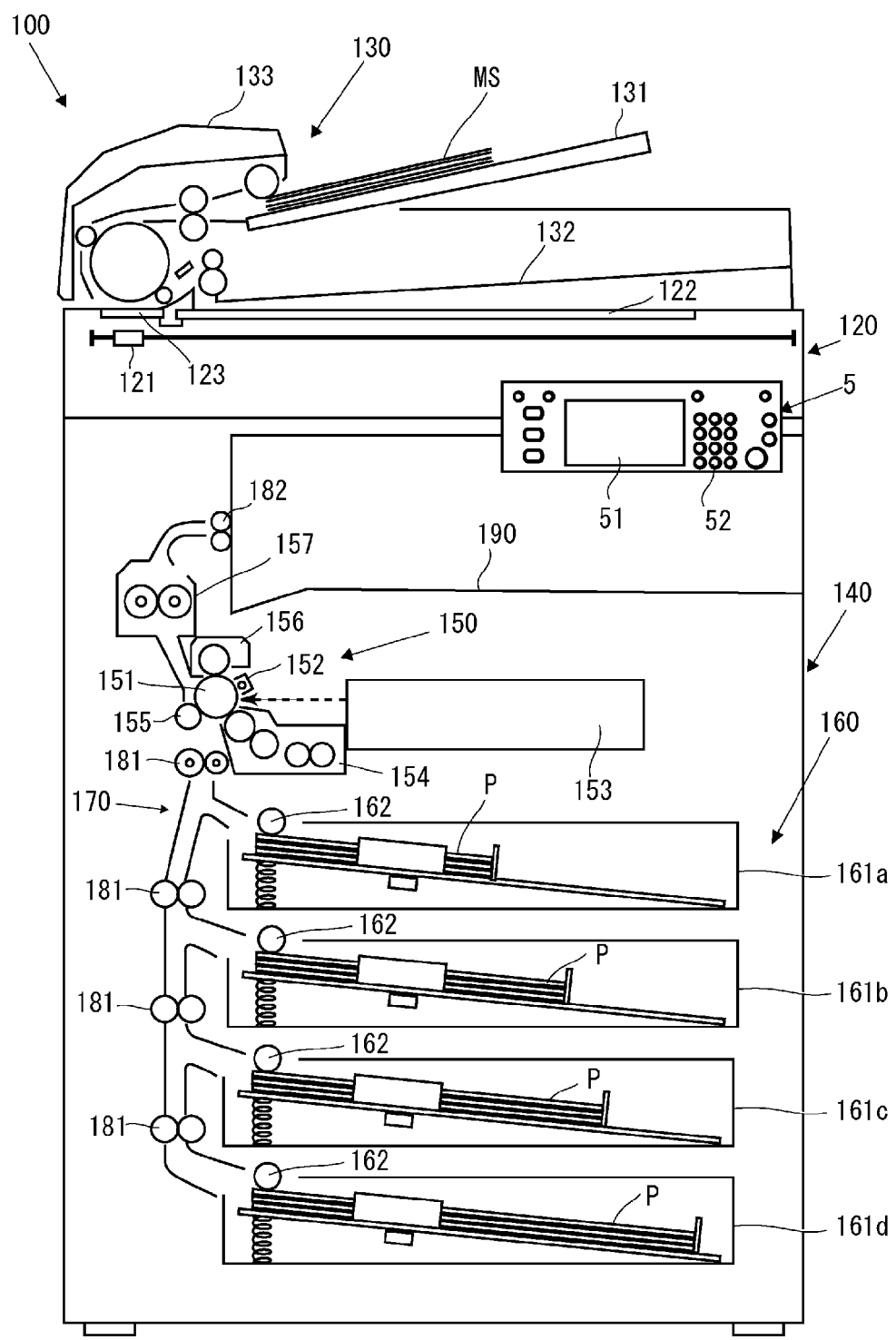
FIG. 1 schematically illustrates a cross section of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An embodiment of the disclosure will now be specifically described with reference to the attached drawings. An image forming apparatus 100 according to the embodiment of the disclosure is a multi-functional peripheral having a copy function, a printing function, a scanner function, or a similar function. With reference to FIG. 1, the image forming apparatus 100 includes a document reading unit 120, a document feeding unit 130, and a main unit 140. The document reading unit 120 is arranged on the main unit 140. The document feeding unit 130 is arranged on the document reading unit 120. An operation unit 5 is arranged on the front surface side of the image forming apparatus 100. The operation unit 5 performs settings or operation instructions for the image forming apparatus 100.

The operation unit 5 includes a display unit 51 and an operation button 52. The operation button 52 includes a numeric keypad, a reset key, a stop key, permanent operation keys such as a start key, and a split screen key. The numeric keypad is to input values such as the number of sheets to be printed. The reset key is to input an instruction for initializing setting information. The stop key is to stop a copy operation, delete an input value, and perform a similar operation. The permanent operation keys include a start key that inputs an output instruction for starting a printing operation. The split screen key is to input the instruction for displaying a screen of the display unit 51 as split screens.

The operation unit 5 includes, as a mode switch key for functions, a copy key for instructing the copy function, a scanner key for instructing the scanner function, and a print key for instructing the printing function. The operation unit 5 displays an operation screen corresponding to a function mode instructed by the mode switch key for these functions on the display unit 51. The mode of the copy function performs printing image data of a document MS read by the document reading unit 120 on a recording sheet P by the main unit 140. In the mode of the scanner function, the image forming apparatus 100 performs such as storing the image data of the document MS read by the document reading unit 120 into a storage unit and transmitting via a network (such as facsimile transmission). In the mode of the printing function, the image forming apparatus 100 performs printing the image data stored in the storage unit on the recording sheet P by the main unit 140.

The display unit 51 includes a display panel, which displays the various operation keys for accepting operation inputs, and a touch panel, which is located at a display surface of the display unit 51. The touch panel detects a touch input by pressing with a fingertip of an operator, a stylus, or a similar tool and outputs a signal corresponding to a position where the touch input is detected. Thus, the touch panel accepts an operation to the operation key displayed on the display unit 51. For example, a liquid crystal display panel may be used as the display panel. For example, a resistance film system and a capacitive touch-screen may be employed for the touch panel.

The display unit 51 is constituted so as to be capable of displaying the screen as split screens. Specifically, when the split screen key (not illustrated) is pressed, a display area of the display unit 51 is split into right and left parts. Accordingly, the display unit 51 displays the screen on each split display area. The display unit 51 can simultaneously accept operations from a user on the respective screens. On each screen accepting the operation, the display unit 51 can perform various settings such as an indication of a state of the image forming apparatus 100, displays of a state of image formation and the number of print copies; and as the touch panel, functions such as duplex printing and black-and-white inversion, magnification setting, and print density setting. The display area of the display unit 51 may be split into two areas vertically or split into more than two areas where the split screen key is pressed.

The document reading unit 120 includes a scanner 121, a platen glass 122, and a document reading slit 123. The scanner 121 is constituted of an exposing lamp and a Charge Coupled Device (CCD) sensor or a similar component. The scanner 121 is movable in a direction of the document MS conveyed by the document feeding unit 130. The platen glass 122 is a document platen constituted of a transparent member such as glass. The document reading slit 123 includes a slit formed perpendicular to the direction of the document MS conveyed by the document feeding unit 130.

To read the document MS placed on the platen glass 122, the scanner 121 moves to a position facing the platen glass 122. Then, the scanner 121 reads the document MS while scanning the document MS placed on the platen glass 122, and obtains the image data. To read the document MS conveyed by the document feeding unit 130, the scanner 121 moves to the position facing the document reading slit 123. Then, the scanner 121 reads the document MS via the document reading slit 123 synchronizing a conveying operation of the document MS by the document feeding unit 130, thus obtaining the image data.

The document feeding unit 130 includes a document placement unit 131, a document discharging unit 132, and a document conveying mechanism 133. The document conveying mechanism 133 sequentially feeds the document MS placed on the document placement unit 131 one by one. The document MS is conveyed to the position facing the document reading slit 123 in the document reading unit 120, and then is discharged to the document discharging unit 132. The document feeding unit 130 is constituted to be collapsible. Lifting up the document feeding unit 130 causes a top surface of the platen glass 122 to be released.

The main unit 140 includes a paper sheet feeder 160, a conveyance path 170, conveyance rollers 181, discharge rollers 182, and an in-barrel discharge tray 190, as well as including an image forming unit 150. The in-barrel discharge tray 190 is located in in-barrel discharge space in the image forming apparatus 100.

The paper sheet feeder 160 includes a plurality of sheet feed cassettes 161a to 161d and feed rollers 162. The sheet feed cassettes 161a to 161d store the recording sheet P. The feed rollers 162 feed the recording sheet P from the sheet feed cassettes 161a to 161d to the conveyance path 170 one by one. The feed rollers 162, the conveyance rollers 181, and the discharge rollers 182 function as a conveying unit. The conveying unit conveys the recording sheet P. The feed roller 162 feeds the recording sheet P to the conveyance path 170. The conveyance rollers 181 convey the recording sheet P to the image forming unit 150. Then, the recording sheet P recorded by the image forming unit 150 is guided by the discharge rollers 182 to be output as printed matter to the in-barrel discharge tray 190. The paper sheet feeder 160 according to the embodiment includes four units of the sheet feed cassettes 161a to 161d.

The image forming unit 150 includes a photoreceptor drum 151, a charging unit 152, an exposing unit 153, a developing unit 154, a transfer unit 155, a cleaning unit 156, and a fixing unit 157. The exposing unit 153 is an optical unit including a laser device, a mirror, and a similar component. The exposing unit 153 outputs laser beam based on the image data to expose the photoreceptor drum 151 charged by the charging unit 152 and forms an electrostatic latent image on the surface of the photoreceptor drum 151. The developing unit 154 is a developer unit that develops the electrostatic latent image formed on the photoreceptor drum 151 with toner and forms a toner image based on the electrostatic latent image on the photoreceptor drum 151. The transfer unit 155 transfers the toner image formed on the photoreceptor drum 151 by the developing unit 154 to the recording sheet P. The fixing unit 157 heats the recording sheet P on which the toner image is transferred by the transfer unit 155 and fixes the toner image on the recording sheet P.

Figure 2:
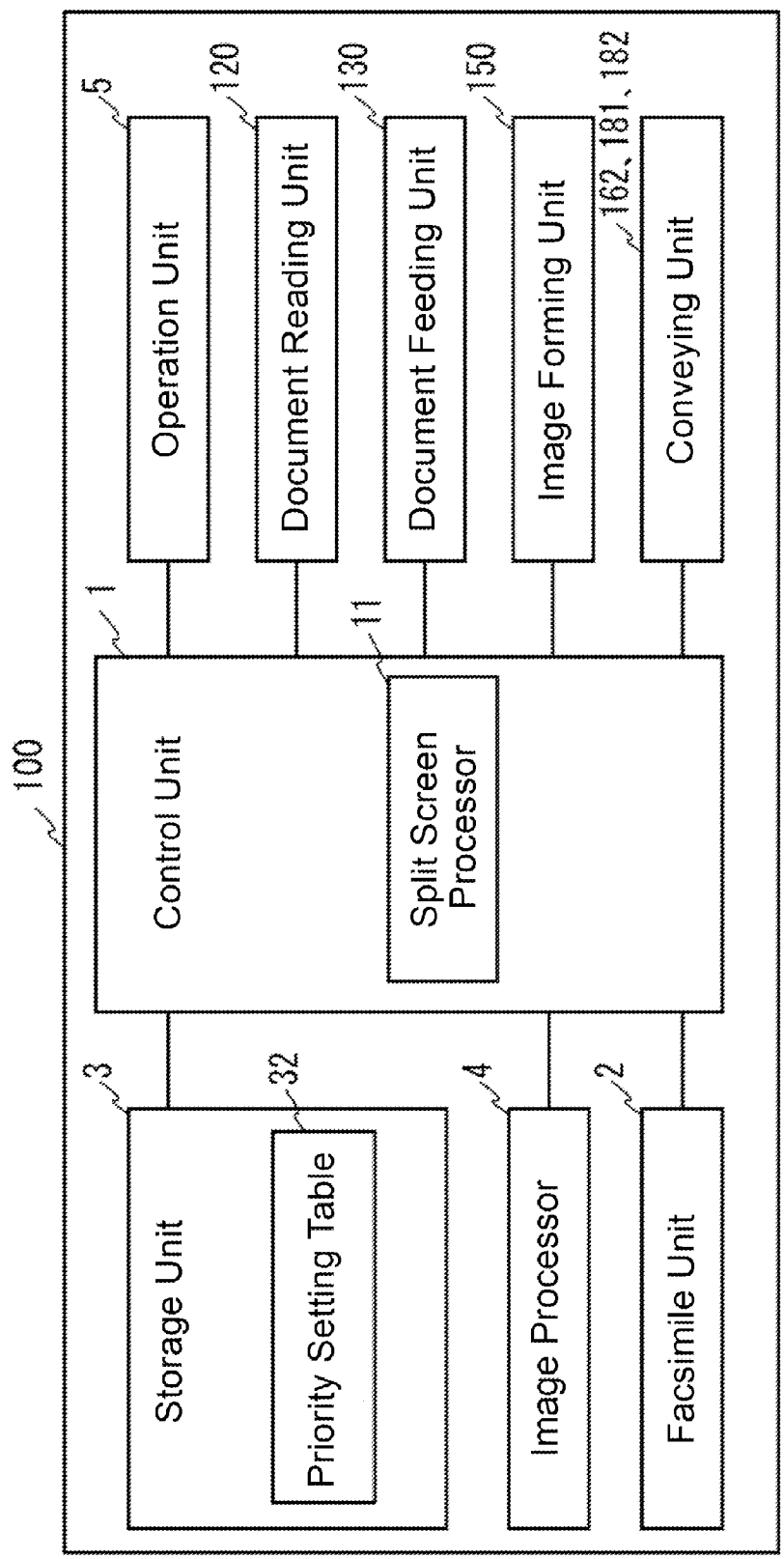
FIG. 2 illustrates a schematic configuration of the image forming apparatus according to the one embodiment.

With reference to FIG. 2, the operation unit 5, the document reading unit 120, the document feeding unit 130, the image forming unit 150 and the conveying unit (feed roller 162, conveyance rollers 181, and discharge rollers 182) in the image forming apparatus 100 are connected to a control unit 1. Accordingly, the control unit 1 performs operation controls of the respective units. A facsimile unit 2, a storage unit 3 and an image processor 4 are also connected to the control unit 1.

The facsimile unit 2 has a modem and includes a facsimile transmission function and a facsimile reception function. The facsimile transmission function generates a facsimile signal from the image data read by the document reading unit 120 and the image data stored in the storage unit 3, and transmits the generated facsimile signal via the network such as a telephone network. The facsimile reception function receives the facsimile signal via the network such as the telephone network.

The storage unit 3 is constituted of the storage unit that consists of such as a semiconductor memory and a Hard Disk Drive (HDD) in which the image data obtained by reading a document using the document reading unit 120 and the image data received by the facsimile unit 2 are mainly stored. The storage unit 3 also stores a priority setting table 32 for which a priority level displayed on the screen is set depending on display content on the screen when the screen is displayed as split screens.

FIG. 3 illustrates a setting example for the priority setting table 32. The display content on the screen and the priority level are stored correspondingly to each other in the priority setting table 32. The priority level can be set from 1 to 9. The larger value is defined as the higher priority level. For the display content, the priority level for the items of system settings, address book registration, and an on-screen keyboard are set to "8," while the priority level of the copy function and a facsimile function are set to "2." When the screen is split, the display area on each screen displayed as split screens is determined according to the priority level for the display content displayed on the screen. For example, when system settings for the display content are provided on one screen and the copy function for the display content is provided on the other screen, the display area is split in a ratio of 8:2 because the priority level of system settings and the copy function are set to "8" and "2," respectively. A system settings screen is displayed on the display area accounting for the ratio value of "8." A copy function screen is displayed on the display area accounting for the ratio value of "2." Therefore, the priority level for the display content such as system settings and address book registration, in which its input operation requires some time to complete, is set to be higher. This ensures that the display area can be wider when the screen is displayed as split screens. The user can configure each setting item of the priority setting table 32 via the operation unit 5.

The control unit 1 is an information processing unit such as a microcomputer that includes a Read Only Memory (ROM), a Random Access Memory (RAM), and a similar memory. The ROM stores control programs for performing the operation control of the image forming apparatus 100. The control unit 1 reads out the control program stored in the ROM and loads the control program on the RAM, so as to perform a control on the entire apparatus corresponding to predetermined instruction information input from the operation unit 5. Additionally, the control unit 1 functions as a split screen processor 11. The split screen processor 11 allocates a split ratio of the screen according to the priority level being set in the priority setting table 32 when the split screen operation is performed.

Figure 4:
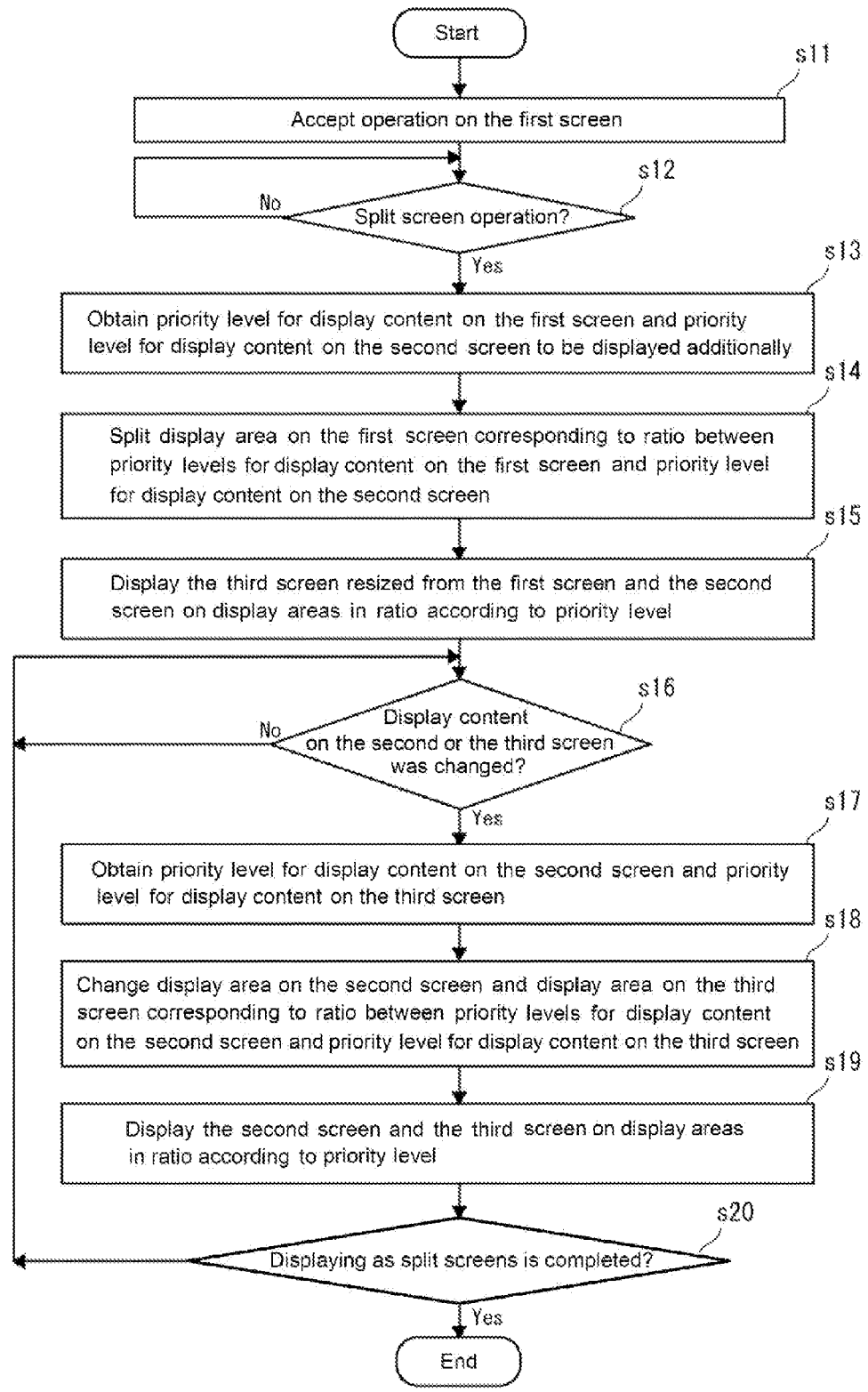
FIG. 4 illustrates a flow of processes for a split screen processor according to the one embodiment.

A flow of processes for a split screen will now be specifically described with reference to FIG. 4.

While the control unit 1 displays the first screen as one screen on the display area in the display unit 51, the control unit 1 accepts the operations from the user on the first screen (step s11). The split screen processor 11 waits until the split screen operation, such as the split screen key (not illustrated) to be pressed, is performed (No at step s12). Once the split screen operation is performed (Yes at step s12), the split screen processor 11 refers to the priority setting table 32 to obtain the priority level for the display content on the first screen which has been displayed, and the priority level for the display content on the second screen to be displayed additionally (step s13). For the split screen operation, when the copy key, a FAX key, or a similar key is operated immediately after the split screen key is pressed, the display content on the second screen to be displayed additionally is replaced by the screen that accepts the operation corresponding to the copy function and the facsimile function depending on the key being operated.

Next, the split screen processor 11 splits the display area of the display unit 51 into two parts corresponding to the ratio between the priority level for the display content on the first screen and the priority level for the display content on the second screen (step s14). Subsequently, the split screen processor 11 controls the display unit 51 to display the third screen, to which the first screen is resized so as to be matched with the split display area, and the second screen to be displayed additionally on the display areas in the ratio according to the priority level (step s15). The third screen can continue to accept the operations from the user on the first screen. The third screen is the screen such as the first screen being scaled down. The third screen and the second screen are displayed so as to be able to simultaneously accept the operations from the user.

Figure 5A:
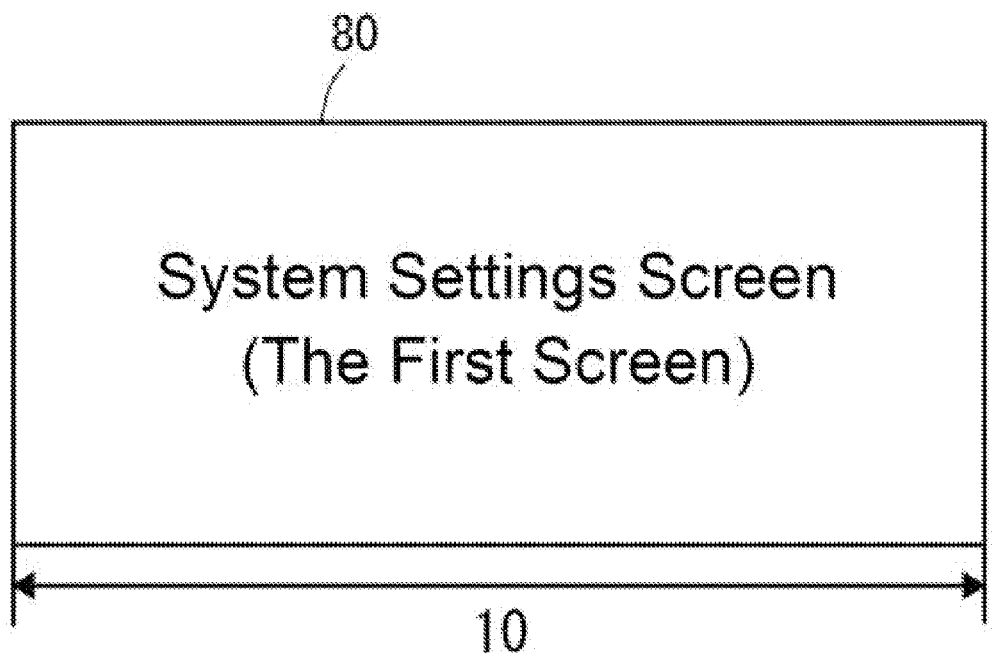
FIGS. 5A, 5B and 5C schematically illustrate screens displayed as split screens according to the one embodiment.
Figure 5B:
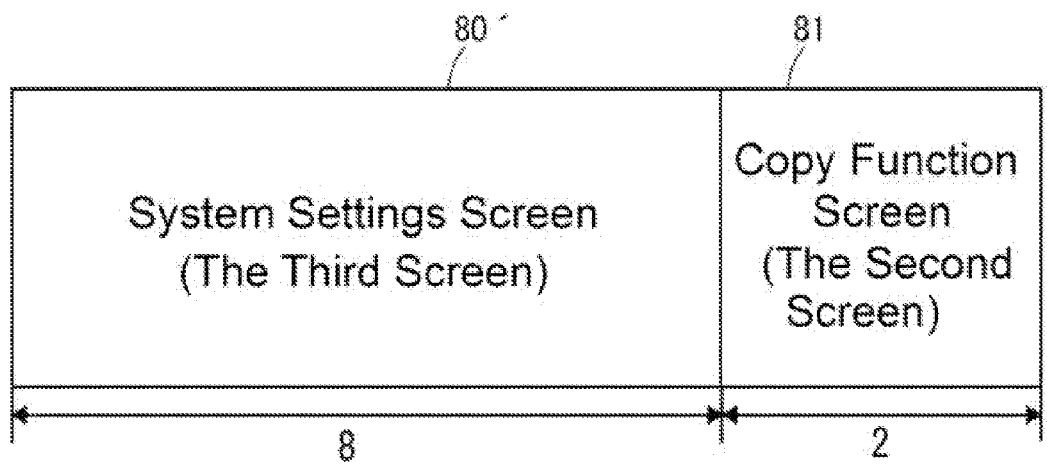
Figure 5C:
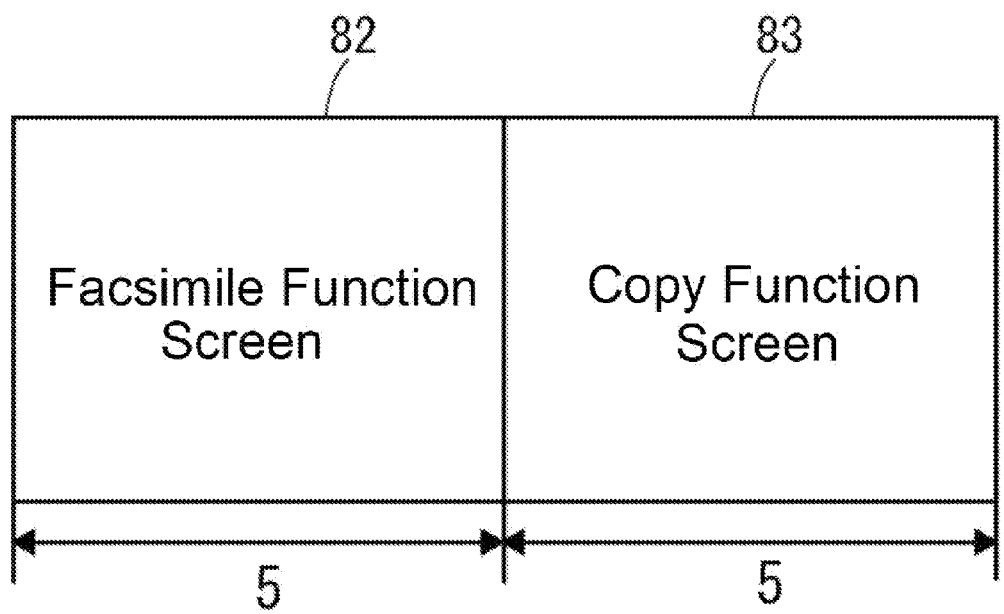

As illustrated in FIG. 5A, for example, assume that the split screen operation of instructing the acceptance of a copy job is performed while accepting the operations from the user on a system settings screen 80 (the first screen) displayed as one screen. The operations for the various settings such as user management and a default action of the image forming apparatus 100 are acceptable on the system settings screen 80. Therefore, setting a plurality of items is operated and this often requires some time to complete. In the priority setting table 32 illustrated in FIG. 3, the priority level for system settings is set to "8," while the priority level for the copy function is set to "2." Consequently, the display area of the system settings screen 80 is split into two parts of left and right sides in a corresponding ratio of 8:2. As illustrated in FIG. 5B, the display area, which is split in the ratio value of 8 and located in the left side, displays a system settings screen 80' (the third screen), while the display area, which is split in the ratio value of 2 and located in the right side, displays a copy function screen 81 (the second screen). The large size of the system settings screen 80' is ensured to some extent even though under the screen being split, and accordingly a setting operation is easier to be performed. As illustrated in FIG. 5C, when the respective split display areas display a facsimile function screen 82 and a copy function screen 83, the respective sizes of the display area become equal because the respective priority levels corresponds to the ratio of 2:2.

The split screen processor 11 monitors an occurrence of a change in the display content on the second screen or the third screen (No at step s16). Upon detection of the change in the display content (Yes at step s16), the split screen processor 11 refers to the priority setting table 32 to obtain the priority level for the display content on the second screen and the priority level for the display content on the third screen (step s17). Subsequently, the split screen processor 11 changes the display area on the second screen and the display area on the third screen dynamically corresponding to the ratio between the priority level for the display content on the second screen and the priority level for the display content on the third screen (step s18). Then the split screen processor 11 displays the second screen and the third screen on the display areas in the ratio according to the priority level (step s19).

Next, the split screen processor 11 determines whether the split screen is completed (step s20); if determined that it is not completed (No at step s20), returns the process to step s16; and terminates this process if the process is determined to be completed (Yes at step s20).

As stated previously, when displaying the screen as split screens, the split screen processor 11 refers to the priority setting table 32 to split the display area on the first screen corresponding to the display content on the first screen being displayed as one screen and the display content on the second screen to be displayed additionally. Subsequently, the split screen processor 11 makes the respective split display areas to display the third screen and the second screen to which the first screen is resized, so as to be simultaneously operable. Therefore, even though one user performs the operation, which requires some time to complete, on the first screen, the user can continue to operate in a state where the display area is secured on the third screen being displayed as split screens. The other user can also concurrently operate on the second screen. This ensures a screen displayed as split screens with a split ratio according to the circumstances, thus enhancing the operability on the screen displayed as split screens.

The disclosure is not limited to the above described embodiments. Needless to say, various modifications can be made within a scope not departing from the spirit of the disclosure.

For example, when the control unit 1 cannot process the instructions operated in parallel on the respective screens displayed as split screens, the control unit 1 may proceed to the process on the other screen upon completion of the process on one screen. For example, when a job for the copy function, which utilizes the paper sheet feeder 160, is input on the second screen while the job using the paper sheet feeder 160 is running in response to the operation accepted on the first or the third screen, the control unit 1 may also accept as a reserved job because its job is incapable of parallel processing due to the paper sheet feeder 160 being occupied. The control unit 1 may also execute the reserved job upon completion of the job process accepted on the first or the third screen.

When a jam occurs in the document conveying mechanism 133 as an automatic sheet feeding mechanism while the job accepted on the first or the third screen is running, guidance, which instructs the jam troubleshooting procedure for clearing the jam, is displayed on the third screen. When the third screen displays the guidance for troubleshooting jam, the control unit 1 may accept as the reserved job even if the job, which influences on the occurring jam, is input on the second screen. For example, in a state where the jam occurs in the document conveying mechanism 133, when a FAX job utilizing the document conveying mechanism 133 is input on the second screen, the control unit 1 may accept the FAX job as the reserved job and runs the reserved job upon completion of a clearance the jam. In the state where the jam occurs in the paper sheet feeder 160, also where a print job utilizing the paper sheet feeder 160 is input on the second screen, the control unit 1 may accept the print job as the reserved job. Assume the case where the jam occurs in the document conveying mechanism 133 and the print job utilizing the paper sheet feeder 160 is input on the second screen, and the case where the jam occurs in the paper sheet feeder 160 and the FAX job utilizing the document conveying mechanism 133 is input on the second screen.

In these cases, the control unit 1 may accept the job input on the second screen to run immediately, which job does not influence on the occurring jam.

For the priority setting table 32, when the state of image formation for the display content is provided, the priority level may be set to be lower (such as "1" or "2"). Exceptionally, to be displayed as one screen may be feasible where an error screen appears.

The disclosure is not limited the configuration where the split ratio is obtained using the ratio corresponding to the priority level for the display content to be split. The disclosure may display the display content in increased size with the higher priority level compared with the lower priority level depending on the predetermined split ratio without depending on the priority level for the display content to be split.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
    an imaging-function display unit including a display panel defining a first-screen display area, and a touch-screen for accepting input of user operations, the display unit enabled to display a third screen in a left-side display area, with respect to a user operating the touchscreen, of display areas into which the first-screen display area is split, and display a second screen in a right-side display area of display areas into which the first-screen display area is split;
    a microcomputer configured to function as a display-content-based dynamically proportioning split screen processor enabled to control the imaging-function display unit, in response to a screen split operation when user operations are accepted through the touchscreen, to split the first-screen display area in proportion to first-screen display content and second-screen display content, and display, in the one of the display areas into which the first-screen display area is split, the third screen, being the first screen resized, such as to enable continuous accepting of user operations, and display, in the other of the display areas into which the first-screen display area is split, the second screen such as to enable accepting operations at the same time operations are accepted through the third screen; and
    storage storing a priority-level settings table in which split-screen-proportioning relative, size values prioritized by display content are established;
    wherein
    the split screen processor is further enabled to detect changed second-screen or third-screen display content, and thereupon refer to the priority settings table to obtain split-screen-proportioning relative size values determined by the detected changed display content, and
    dynamically resize the second-screen in proportion to the third-screen, in the screens' left-right orientation, according to the determined split-screen-proportioning relative size values, and
    wherein the priority-level settings table in the storage contains priority-level settings for system-setting and copying functions of the image forming apparatus, with the system-setting priority level being higher than the copying-function priority level.

2. The image forming apparatus according to claim 1, wherein:
    the microcomputer is further configured to function as a control unit that accepts and controls execution of image-forming apparatus jobs input through the touchscreen, and that if during execution of a job accepted through the first or the third screen, a job that cannot be run in parallel with the job being executed is input through the second screen, accepts the input job as a reserve job whose execution the control unit carries out after the job being executed completes.

3. The image forming apparatus according to claim 2, wherein:
    when the third screen displays a guidance for troubleshooting jam in response to a jam that occurs during the execution of the job accepted on one of the first and the third screen, the control unit executes the job input on the second screen in parallel with a process for the jam if a job uninfluential on the jam is input on the second screen, and accepts the job as the reserved job to be executed after completing of the process for the jam if a job influential on the jam is input on the second screen.

4. An image forming apparatus according to claim 1, wherein the priority-level settings table in the storage contains priority-level settings for copying and faxing functions of the image forming apparatus, with the copying-function priority level being higher than the faxing-function priority level.

5. An image forming method using an imaging-function display unit including a display panel defining a first-screen display area, and a touchscreen for accepting input of user operations, the method comprising;
   splitting the first-screen display area to display a third screen in a left-side display area, with respect to a user operating the touchscreen, of display areas into which the first-screen display area is split, and display a second screen in a right-side display area of display areas into which the first-screen display area is split;
   controlling the imaging-function display unit to split the first-screen display area in proportion to first-screen display content and second-screen display content;
   displaying, in the one of the display areas into which the first-screen display area is split, the third screen, being the first screen resized, such as to enable continuous accepting of user operations; displaying, in the other of the display areas into which the first-screen display area is split, the second screen such as to enable accepting operations at the same time operations are accepted through the third screen;
   storing a priority-level settings table in which split-screen-proportioning relative size values prioritized by display content are established;
   detecting changed second-screen or third-screen display content, and thereupon referring to the priority settings table to obtain split-screen-proportioning relative size values determined by the detected changed display content; and
   dynamically resizing the second-screen in proportion to the third-screen, in the screens' left-right orientation, according to the determined split-screen-proportioning relative size values, and
   wherein the priority-level settings table in the storage contains priority-level settings for system-setting and copying functions of the image forming apparatus, with the system-setting priority level being higher than the copying-function priority level.

6. An image forming method according to claim 5, wherein the priority-level settings table in the storage contains priority-level settings for copying and faxing functions of the image forming apparatus, with the copying-function priority level being higher than the faxing-function priority level.

7. A non-transitory computer-readable recording medium storing an image forming program for controlling an image forming apparatus comprising an imaging-function display unit including a display panel defining a first-screen display area, and including a touchscreen for accepting input of user operations, the image forming apparatus further comprising a microcomputer and storage, the image forming program causing:
   the display unit to display a third screen in a left-side display area, with respect to a user operating the touchscreen, of display areas into which the first-screen display area is split, and display a second screen in a right-side display area of display areas into which the first-screen display area is split;
   the microcomputer to function as a display-content-based dynamically proportioning split screen processor enabled to control the imaging-function display unit, in response to a screen split operation when user operations are accepted through the touchscreen, to split the first-screen display area in proportion to first-screen display content and second-screen display content, and display, in the one of the display areas into which the first-screen display area is split, the third screen, being the first screen resized, such as to enable continuous accepting of user operations, and display, in the other of the display areas into which the first-screen display area is split, the second screen such as to enable accepting operations at the same time operations are accepted through the third screen; and
   the storage to store a priority-level settings table in which split-screen-proportioning relative size values prioritized by display content are established;
wherein
   the split screen processor is further enabled to detect changed second-screen or third-screen display content, and thereupon refer to the priority settings table to obtain split-screen-proportioning relative size values determined by the detected changed display content, and
   dynamically resize the second-screen in proportion to the third-screen, in the screens' left-right orientation according to the determined split-screen-proportioning relative size values, and
   wherein the priority-level settings table in the storage contains priority-level settings for system-setting and copying funtions of the image forming apparatus, with the system-setting priority level being higher than the copying-function priority level.

8. A non-transitory computer-readable recording medium according to claim 7, wherein the priority-level settings table in the storage contains priority-level settings for copying and faxing functions of the image forming apparatus, with the copying-function priority level being higher than the faxing-function priority level.

* * * * *